United States Patent [19]

Kraemer

[11] Patent Number: 4,965,753

[45] Date of Patent: Oct. 23, 1990

[54] SYSTEM FOR CONSTRUCTING IMAGES IN 3-DIMENSION FROM DIGITAL DATA TO DISPLAY A CHANGING SCENE IN REAL TIME IN COMPUTER IMAGE GENERATORS

[75] Inventor: Werner Kraemer, Binghamton, N.Y.

[73] Assignee: CAE-Link Corporation, Link Flight, Binghamton, N.Y.

[21] Appl. No.: 485,861

[22] Filed: Feb. 23, 1990

Related U.S. Application Data

[63] Continuation of Ser. No. 283,041, Dec. 6, 1988, abandoned.

[51] Int. Cl.[5] .............................................. G06F 15/72
[52] U.S. Cl. .................................................... 364/522
[58] Field of Search ... 364/518, 521, 522, 900 MS File; 340/723, 727, 732, 789, 792

[56] References Cited

U.S. PATENT DOCUMENTS

| 4,398,189 | 8/1983 | Pasierb, Jr. et al. | 340/727 X |
| 4,404,553 | 9/1983 | Cuffia | 340/723 X |
| 4,463,380 | 7/1984 | Hooks, Jr. | 358/104 X |
| 4,475,161 | 10/1984 | Stock | 364/521 |
| 4,642,621 | 2/1987 | Nemoto et al. | 340/723 X |
| 4,715,005 | 12/1987 | Heartz | 364/521 |

Primary Examiner—Gary V. Harkcom
Assistant Examiner—Mark K. Zimmerman
Attorney, Agent, or Firm—Malin, Haley, McHale, DiMaggio & Crosby

[57] ABSTRACT

A three-dimensional image processing system which reconstructs real-time display images from scene photographs. The system permits real-time projection of multiple, digitized, photographic databases into the eye space of an unconstrained observer. From the photographic databases, the system forms a composite output image as well as line-of-sight range overlay which permits easy expansion into a multi-channel architecture and to provide line-of-sight range envelope around the observer. The system allows for arbitrary insertion of three-dimensional, independently moving, opaque or partially transparent objects.

8 Claims, 3 Drawing Sheets

SYSTEM FOR CONSTRUCTING IMAGES IN 3-DIMENSION FROM DIGITAL DATA TO DISPLAY A CHANGING SCENE IN REAL TIME IN COMPUTER IMAGE GENERATORS

This is a continuation of application Ser. No. 07/283,041, filed Dec. 6, 1988, now Abandoned.

BACKGROUND OF THE INVENTION

The present invention, generally, relates to systems for generating images from digital data and, more particularly, to a system for constructing such images in three-dimensions from digital data to display a changing scene in real time as viewed from a moving eyepoint. The system of the present invention constructs images in real time from multiple, digitized, photographic databases for viewing along a line-of-sight that may change.

In simulator visual systems, a highly textured, natural scene environment is the objective for realism, especially in simulation of moving ground systems, where developing judgment for maneuverability on surface patches and for concealed approach require photographic texture.

The complexity of a visual scene generated in real-time by computer image generation equipment is largely dependent upon the data structure and the method of storage of the scene components. Traditionally, visual databases contain the minimum amount of data possible to describe a scene in terms of an abstraction of its components.

This scene modelling produces raw data types (e.g., vertices and color) and relational data types, which establish the connectivity of raw data to edges, surfaces, objects and images. The expense of high speed storage media forces ever higher abstraction of scene components to compact computer representations.

In addition to dynamic scene transformation, manipulation of such data structures requires complex algorithms such as those for transversal of separating plane trees to resolve object priority, object list processing index into a table of raw data types, and selection of object detail depending on distance. Hardware implementations of these algorithms require a relatively large number of functionally different circuit boards. This functional division of high speed hardware makes computer image generation system equipment expensive in terms of output scene quality, which is directly related to the level of abstraction in the computer modelling.

By reducing the number of data types, a corresponding increase in the hardware function utilization factor is achieved. This utilization factor can be measured in terms of data coherence, which is defined as the spatial and temporal domain for which a single data type is applicable.

A data structure that describes an object fully with a single data type is called "object coherent". Such a data type is a pixel in a digitized image of the object and consists of an x, y, z, and a color component.

The function performed on this single data type applies the function to the whole object. This concept necessitates real-time object collection into a composite output scene.

The concept involved in the present invention is based on a scene coherent data structure. Its database contains preprocessed scenes of only one type of data item. The data item is the pixel in the scene coordinate system that consists of azimuth, elevation, range and color.

The function performed on this data item applies the function to the scene, and thus, the hardware utilization factor is maximized. Scene coherent data structures, containing whole objects or even panoramic scenes, preserve a continuous texture flow in the output scene but require large amounts of data storage capacity.

OBJECTS AND SUMMARY OF THE INVENTION

It is an object of the present invention to provide a computer image system for constructing images from digital data to display a scene for viewing from a moving eyepoint.

It is also an object of the present invention to provide a three-dimensional computer image generation system for constructing images from digital data to display a scene in real-time as viewed from a moving eyepoint.

The above and other objects of the present invention are achieved from a structural arrangement involving at least two pipeline circuits to process image data as viewed from at least two different eyepoint locations. At the input, a digital data storage device receives pixel brightness data and also pixel distance data. A pixel processing circuit transforms this pixel data received from the storage device to a characteristic for each pixel as it is viewed from a changing eyepoint location. A priority circuit is connected to receive the transformed pixel data from each pipeline to determine the priority between different image data at different distances for the same scene pixel. A frame buffer retains temporarily a frame of processed scene data while the immediate past frame is being displayed.

DETAILED DESCRIPTION

For the presently preferred embodiment of the invention, the following detailed description will identify the respective circuit component parts, describe their interconnection and will explain their operation.

Figure 1:
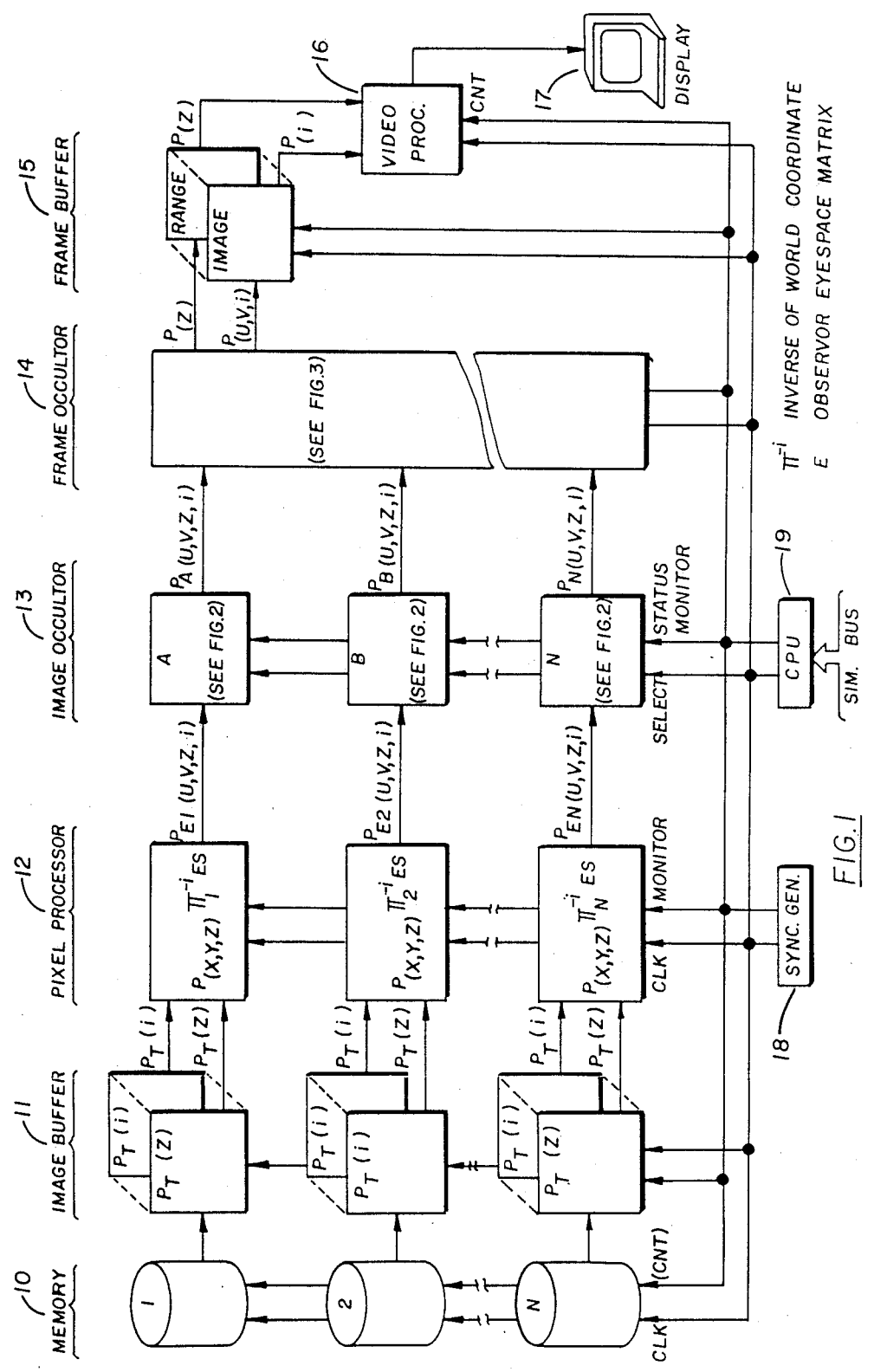
FIG. 1 shows an image processor circuit architecture connected and arranged in accordance with the principles of the present invention.

While any suitable source of image data may serve as appropriate input for the circuit of the invention, a memory is identified generally by the reference number 10 in FIG. 1 of the drawings.

The database stored in the memory 10 is digitized data of photographic scenes that are divided into frames. Associated with each scene frame are one or more range image overlay frames. These range image overlay frames define the line-of-sight range from the origin of the source photographic equipment to the smallest resolvable picture element (or pixel).

Methods of generating such range image overlays include slow scan radar images taken at the origin center of the source photographic equipment, projecting topographical data, like the United States Geographical Survey Terrain Data, and line-of-sight range data generated by a digital image generator in emulation mode. Thus, the outputs of the memory 10 system are digitized scene image frames and associated range image overlay frames.

The database for the three-dimensional image processing system is divided into two parts:
the photographic source data archives, and
the visual scene database.

The photographic source data archives are a repository of digitized photo-imagery of terrain scenes, cultural and vegetation features, vehicles and special effects. Such a database can be thought of as the component parts of a model board but in digital form.

The visual scene database can be compared with the finished model board for a specific training requirement. The component parts of the photographic database are combined into a large number of scenes at the nodes of a gaming area grid pattern. The spacing of the grid patterns is a function of how far the observer moves before the surface texture closest to the observer would have to be magnified, appear to defocus and, thus, are replaced with a scene from the nearest node.

Each scene consists of a primary scene covering the most relevant surfaces and one or more fill scenes covering those surfaces which are not resolved in the primary scene. This is similar to taking a photograph of a building, such as a house, from an angle where most of the surfaces are covered in the primary photograph, while a second or more photographs show the remaining surfaces of the house.

The number of photographs taken depends on the observer requirements: If he observes the house from all angles around a half-sphere from a distance of some 100 feet, then, two or three photographs will suffice. If, on the other hand, there is a requirement to display more details, such as creosote deposits in the chimney, additional photographs need to be taken. While this may sound prohibitive, it is no different from the databasing requirements of a Digital Image Generator database.

Since the present invention does not consist in the database preparation process, further details are deemed unnecessary. The invention described and claimed herein is a system to utilize any database that is constructed of an image frame and a range image overlay frame, no matter how it is generated.

In a manner that will be described in more detail presently, frames of data are acquired from the memory 10 and are stored in the frame buffer array 11. Since the field-of-view, pitch, roll, yaw, x, y and z are known for their respective video frames, each pixel address in the frame buffer 11 determines an instantaneous azimuth and elevation relative to the spherical coordinate system of the source photographic equipment.

Additionally, the range image overlay data defines the line-of-sight range within the same system, and thus, all parameters are known in three-dimensional space in world coordinates. Therefore, the output of the frame buffer to the pixel processor 12 are instantaneous azimuth, elevation and line-of-sight range.

The pixel processor 12, as identified in FIG. 1 of the drawings, may also be called a "pipeline processor device". It has three input channels:
A. The azimuth, elevation and line-of-sight range from the image buffer 11.
B. The instantaneous image texture element.
C. Coordinate transfer matrix supplied by a circuit that will be described in more detail presently.

The function of the pixel processor 12 is to multiply the item defined in paragraph A, above (i.e., the azimuth, elevation and line-of-sight range), by the item defined in paragraph C (i.e., the coordinate transfer matrix). The output of the pixel processor 12 is the transformed input pixel x, y and z mapped to the observer viewing screen coordinate space (screen (u), screen (v), line-of-sight distance) and the unmodified item B, above (i.e., the instantaneous image texture).

An image occultor circuit 13 is, preferably, an "inserting" frame buffer connected to receive an input from the pixel processor circuit 12. The image occultor circuit 13 connected directly with the output of the pixel processor circuit 12, together function as a "pipeline processor".

The output from the pixel processor circuit 12 is the instantaneous screen address (u, v) and the line-of-sight range as well as the instantaneous image texture element. The previous line-of-sight distance at the present screen address is compared with the present line-of-sight distance.

If the present line-of-sight distance is smaller (i.e., nearer to the observer's eyepoint) the previous line-of-sight is over-written (or is occulted) with the present line-of-sight distance, while the corresponding texture element is written into the image buffer 11. At the end of the current frame time, this process yields an image and a range image overlay corresponding to the instantaneous observer position and attitude. The range image overlay and the buffered image are the output of the inserting frame buffer (or the image occultor circuit 13).

A frame occultor circuit 14 (which is, preferably, in the form of a "comparator" circuit) is connected to receive the image and the range image overlay inputs from two or more image occultor circuits 13, where the range image overlays are compared on the subsequent real-time frame to yield an output range image overlay which, for each resolvable picture element, chooses the closest line-of-sight range from all of the inputs. The image occultor circuit 13 that supplied the smallest instantaneous line-of-sight range also supplies the corresponding image texture element. The frame occultor circuit 14 writes the line-of-sight range into an output range frame buffer circuit 15, along with the corresponding image texture element.

The output frame buffer circuit 15 contains the final display image and, also, the corresponding line-of-sight range image overlay. The function of this output frame buffer circuit 15 is to store the final display image for the duration of the active raster. The output of the frame buffer circuit 15 is connected to an output video processor circuit 16 and contains both the image texture element and the line-of-sight range.

The function of the output video processor circuit 16 is to manipulate the image texture elements as a function of line-of-sight range, such as haze, fading, etc. The output of the video processor circuit 16 is, therefore, the composite video and synchronization signal to the final display monitor 17.

A synchronization generator circuit 18 is shown in FIG. 1 of the drawings as being connected to each of the circuit components in the Figure in order to provide clock and monitor timing signals for synchronizing the actions in the usual way.

A visual control computer 19 contains, in the presently preferred form of the invention, a laser video disc geography map which, for each frame under this, indicates the type of frame stored, such as image or range image overlay, and coordinate system data, such as field-of-view, pitch, roll, yaw, x, y and z of the source photographic equipment in world coordinates. An input to the visual control computer 19 is the eyepoint of the observer coordinate transformation matrix. This transformation matrix determines which frame is acquired from the laser video disc and stored in the input frame buffer array.

Figure 2:
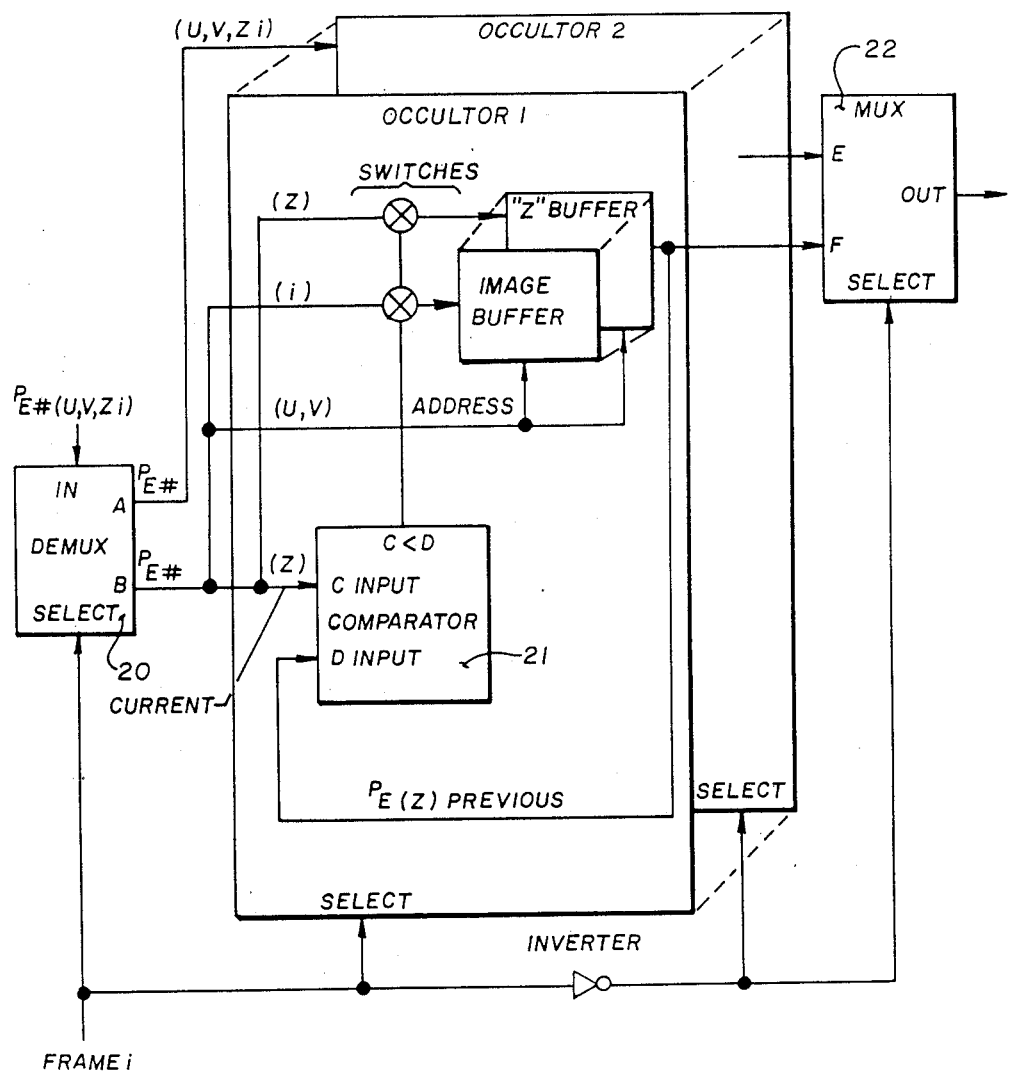
FIG. 2 shows a circuit arrangement, in accordance with the invention, to determine priority between different data for display at a single pixel location.

For more details of the image occultor circuit 13, reference is made to FIG. 2 of the drawings. A demultiplexer circuit 20 switches the input signal between the image occultor circuit A and the image occultor circuit B, preserving the current frame for subsequent comparison and readying the other inserter circuit for current frame operations. The input PE (U, V, Z, I) which denotes the screen coordinates u, v, line-of-sight range z and image texture element I are selected by the visual control computer 19 (FIG. 1) to be applied to the currently active inserter circuit.

Comparator A B compares the input PE (z) with the line-of-sight range currently deposited at PE (U, V) and deposits at that address both PE (I) and the new line-of-sight range if the current line-of-sight range is smaller, i.e., closer to the observer eyepoint, than the previously deposited range. The output multiplexer circuit 22 selects the past inserter frame for output to the comparator circuit 14 (FIG. 1).

Figure 3:
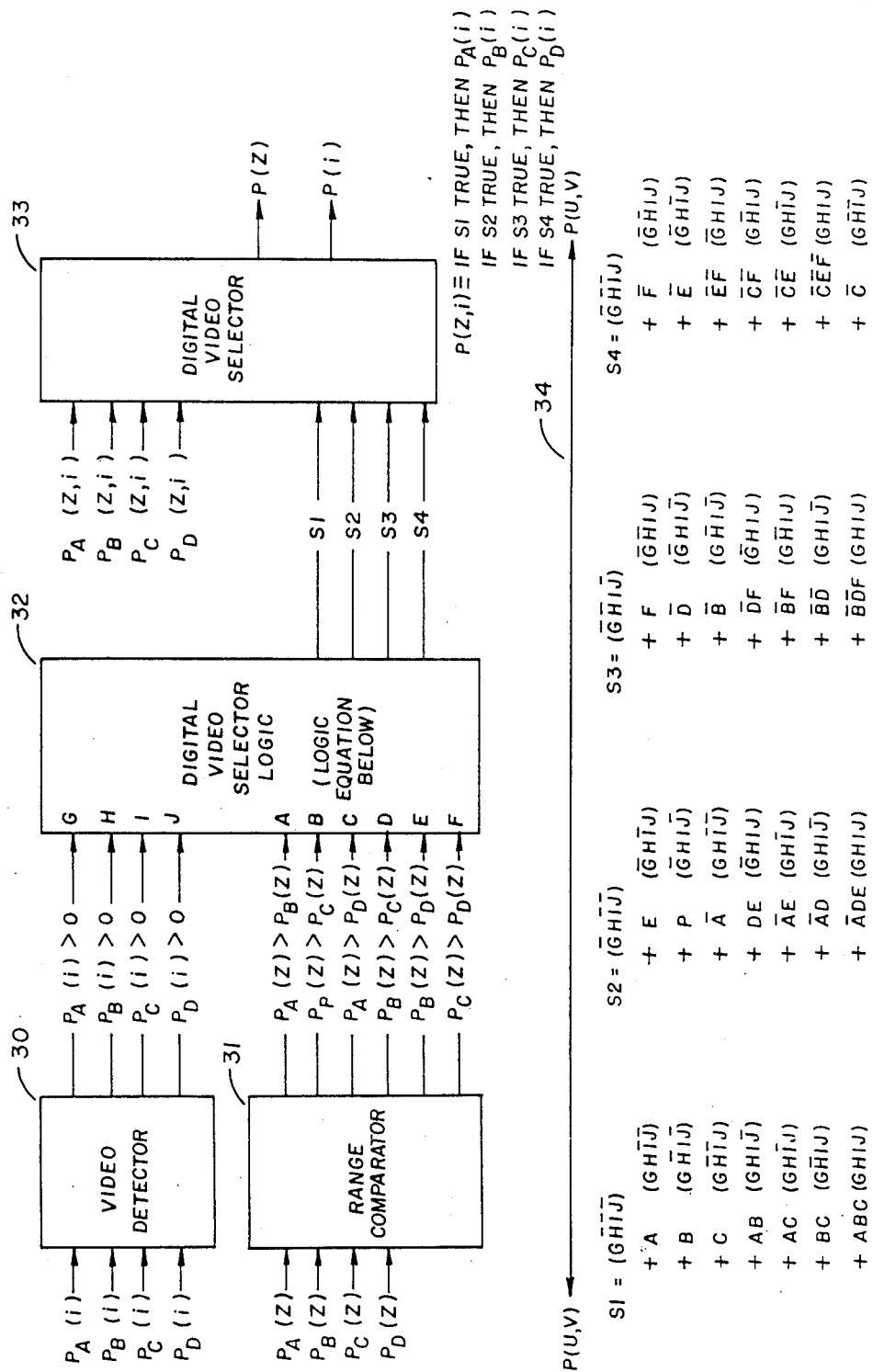
FIG. 3 is a view to illustrate the operation of a frame occultor in accordance with the invention.

For more details of the frame occultor circuit 14, reference is made to FIG. 3 of the drawings which shows inputs from four (4) image occultor circuits. A video detector circuit 30 receives, as its input, the image levels $P_{(i)}$ from the image occultor circuit 13. A comparison is performed to discriminate valid video from blank frame buffer areas. This comparison sets the respective output line "true" if the image level is greater than zero.

A range comparator circuit 31 receives, as its input, the range values $P_{(z)}$ from the image occultor circuit 13. A comparison is performed to yield the output parameters indicated in FIG. 3 which is a list of possible range comparison combinations.

A digital video selector logic circuit 32 generates the enabling output selector signals (a set of four mutually exclusive selector signals) based on the logic equation shown in FIG. 3. In this equation, a multiplication indication (an algebraic relation) identifies a logical AND operation, and a positive sign identifies a logical OR operation.

The output from a digital video selector circuit 33 enables the respective $P_{(z,i)}$ parameters as a function of the mutually exclusive selector signals from the digital video selector logic circuit 32.

All of the addresses for the respective "u" and "v" signals 34 are identical and are synchronized by the sync. generator 18, FIG. 1.

The output display 17 of the three-dimensional image processing system of the present invention, in FIG. 1, exhibits the image detail of the original digitized photographic image scene details. Special three-dimensional image processing functions, such as haze, smoke, etc., are implemented in the video processor circuit 16.

The additional element needed to view a photographic image from an eyepoint other than the one from which the photograph was taken is the "range datum" along with the image datum at each resolvable picture element in the photograph. If such range data points are generated in the form of an intensity level for each resolvable picture element, this precisely registered "range overlay" provides the additional element for three-dimensional viewing.

To resolve the hidden surfaces of the first photographic image, a second diametrically opposite picture is taken and the associated range overlay is constructed. This process is continued until all surfaces of interest are resolved. Traditional processes, which do not utilize the "range overlay", required many images of an object from all possible attitudes and ranges to the object; thus demanding unattainable mass storage requirements for real-time access.

For an example of a use for the "range overlay", the mass storage requirement for an object like a cube is scaled down to two images, taken from diametrically opposite corners of the cube looking toward its center, and two "range overlays".

In accordance with the invention, a data structure in any suitable form for three-dimensional photographic views of scenes are stored along with any associated algorithms. The views of these scenes are reconstructed at unconstrained eyepoints in real-time.

To gain real-time access, the image and scene databases are stored on video-speed mass storage devices, such as constant angular velocity laser video discs, in the presently preferred embodiment. This system is referred to as the three-dimensional image processing system of the invention.

A dynamic, real world visual scene is variable in both space and time. Unrelated objects traverse the terrain and spectral densities received by the human visual system vary due to moving sources of illumination. Surface reflection characteristics of objects change with the time of day and season.

In constructing a real model of that scene, an attempt is made to preserve as many characteristics of the real-world as possible by making the least amount of approximations, idealizations and assumptions. To derive at increasingly compact representations of the real world abstraction, a complex relational informational structure is used.

Relational data types establish the connectivity of raw data, such as vertices and color, to edges, surfaces, objects and scenes. In real-time image generation systems, the level of compact representation is maximized when the correspondence data retrieval algorithms can reconstruct the real model in sufficiently small time slices to appear dynamically continuous to the human visual system.

In addition to dynamic scene transformation, manipulation of such data structures requires algorithms like transversal of separating plane trees to resolve object priority, object list processing to index into a table of raw data, and selection of object detail depending on distance. Hardware implementations of these algorithms require a relatively large number of functionally different circuit boards.

This functional division of high speed hardware makes computer image generation equipment expensive in terms of simulated output scene quality relative to the real world. Now that the factors contributing to the cost of the system are identified, such as the labor intensive data abstraction, the large number of functionally different circuit boards and the large hardware utilization factor, an attempt can be made to reduce overall system cost.

A reduction in overall system cost requires an assumption of spatial and temporal invariance of the real world. This would limit real world terrain and objects to be rigid and sampled at a particular time interval.

A sample terrain would be one of a particular season, at a particular time of day, producing no shadows, containing only fixed objects. Objects to be inserted into that scene would contain no flexing surfaces, being sampled under similar illumination conditions.

It is in this environment that the present invention provides a cost-effective solution. Scene photographs are digitized into frame image data files, and with the aid of terrain maps and scene registration, the "range image overlay" is generated. This establishes a "scene coherent" database.

Independent objects are prepared similarly for object "coherent" data files. During "range image overlay" generation, the elements of the scene and object attitude matrices are identified and deposited, along with the frame image data and the "range image overlay", as "frame data" on high speed laser video disc frames. This data is acquired and is processed at video speed in image processing pipelines and superimposition hardware to display high-detail images at unconstrained observer eyepoints.

Data "coherence" is defined as the spatial and temporal domain for which a single data type is applicable.

A data structure that fully describes an object with a single data type is called "object coherent". Such a data type is a pixel in a digitized representation of the object and consists of x, y and z, color and, possibly, other components.

The function performed on this single data type applies the function to the whole object. This action necessitates real-time object collection into a composite output scene.

It is a "scene coherent" data structure that is used in the present invention. The database memory 10, FIG. 1, contains pre-processed scenes of only one type of data item, i.e., the "pixel". It is the "pixel" in the scene coordinate system that consists of azimuth, elevation, range and color.

The function performed on this data item applies the function to the scene, in order to achieve a hardware utilization factor that is maximized. "Scene coherent" data structures, containing whole objects or whole panoramic scenes, keep a continuous texture flow in the output scene but require much larger data storage capacity.

While the preferred embodiment of the present invention has been shown and described in detail, it is apparent to those skilled in the art to which the invention pertains that various modification and changes may be made without departing from the true spirit of invention. Accordingly, it is intended that the invention be limited only by the scope of the claims appended hereto.

I claim:

1. A three-dimensional computer image generation system for constructing images from digital data to display a scene in real-time as viewed from a moving eyepoint, comprising:

at least two pipeline circuit means to process image objects as viewed from at least two different eyepoint locations;

each of said pipeline circuit means comprising:

digital data storage means including input means to receive pixel brightness data and pixel distance data; and pixel processing means to transform pixel data received from said storage means to a characteristic for each pixel as viewed from a changing eyepoint location;

frame occulting circuit means having an input to receive the transformed pixel data from each pipeline circuit means to determine priority between different image data at different distances for the same scene pixel and outputting the determined priority; and frame buffer storage means connected to the output of said frame occulting circuit means to retain temporarily a frame of processed scene data while the immediate past frame is being displayed.

2. A three-dimensional computer image generation system as defined in claim 1 wherein said pixel processing means includes means to determine priority between different data at different distances for the same image pixel.

3. A three-dimensional computer image generation system as defined in claim 2 wherein said means to determine priority between data for the same image pixel includes two occultor circuits, one for alternate frame data and one for intermediate frame data.

4. A three-dimensional computer image generation system as defined in claim 1 including video processing means connected to said frame buffer storage means for receiving a frame of processed scene data from said frame buffer storage means for adjusting the scene data to predetermined screen coordinates for display.

5. A three-dimensional computer image generation system as defined in claim 1 including means connected to said frame buffer storage means to display each frame of a scene.

6. A three-dimensional computer image generation system as defined in claim 1 including means connected to said frame buffer storage means to display each frame of a scene, and including means to determine priority between image data in said pixel processing means for each of said pipeline circuit means.

7. A three-dimensional computer image generation system as defined in claim 1 wherein said digital data storage means includes a data buffer storage means in which is collected individual azimuth, elevation and distance data as input to each pipeline circuit means.

8. A three-dimensional computer image generation system as defined in claim 7 including, for each of said pipeline circuit means, a laser video disc on which is stored database data prepared off-line to define each image to be processed.

* * * * *